United States Patent [19]
Hattori

[11] Patent Number: 5,633,096
[45] Date of Patent: May 27, 1997

[54] BATTERY HOLDER FOR POWER DRIVEN-TOOLS

[75] Inventor: Noriyasu Hattori, Anjo, Japan

[73] Assignee: Makita Corporation, Anjo, Japan

[21] Appl. No.: 588,739

[22] Filed: Jan. 19, 1996

[30] Foreign Application Priority Data

Jan. 20, 1995 [JP] Japan .................................. 7-007463

[51] Int. Cl.⁶ .................................................. H01M 14/00
[52] U.S. Cl. .............................. 429/7; 429/99; 429/100; 320/2
[58] Field of Search .............................. 429/7, 79, 99, 429/100; 320/2

[56] References Cited

U.S. PATENT DOCUMENTS

| | | | |
|---|---|---|---|
| 4,791,347 | 12/1988 | Britton | 320/2 |
| 5,059,885 | 10/1991 | Weiss et al. | 320/2 |
| 5,189,358 | 2/1993 | Tomura et al. | 320/2 |
| 5,476,729 | 12/1995 | Miller, Jr. et al. | 429/1 |

*Primary Examiner*—Stephen Kalafut
*Assistant Examiner*—Jonathan S. Krueger
*Attorney, Agent, or Firm*—Lahive & Cockfield, LLP; W. Hugo Liepmann; Anthony A. Laurentano

[57] ABSTRACT

The present invention provides novel applications of a battery pack, which is detachably attached to specific power-driven tools. A battery holder of the invention is applicable as a separate power source of portable electrical appliances used for and in automobiles. A body (2) of a battery holder (1) is a flat box-like part including an upper housing (3) and a lower housing (4), which are separable from and joined with each other by means of a plurality of bolts (5). A metal hook (6) projected from the lower housing (4) is held and fixed between the upper housing (3) and the lower housing (4). A shoulder belt or hand strap (8) with both ends thereof held by a pair of pins (7,7) extending from the lower housing (4) to the upper housing (3) is attached to the body (2) for making the battery holder (1) handy to carry. A socket element (9) formed on one shorter side of the body (2) is connectable with a cigar lighter plug. An inlet (11) of a battery pack (14) and a cover plate (12) for opening and closing the inlet (11) are provided on the other shorter side of the body (2).

4 Claims, 8 Drawing Sheets

BATTERY HOLDER FOR POWER DRIVEN-TOOLS

BACKGROUND OF THE INVENTION

1. Field of the Invention

The present invention pertains to novel applications of a battery pack detachably attached to specific electrical appliances including portable power-driven tools.

2. Description of the Related Art

A battery pack, in which a battery, such as nickel-cadmium cells or a shielding lead-acid accumulator, is accommodated, is generally applied as a power source of portable power-driven tools. The battery pack with the charged battery therein is detachably attached to, for example, a handle element of specified power-driven tools.

There are other portable electrical appliances used for or in automobiles, for example, ear polishers and hand vacuum cleaners. These portable electrical appliances generally have a power cord with a plug and receive required power from a car battery through a cigar lighter in the vehicle.

The conventional battery pack supplies power to specific electrical appliances only when the battery pack is attached to such electrical appliances. The battery pack detached from the specific electrical appliances cannot be used as a power source for any other portable electrical appliances.

The ear electrical appliances receiving a power through a cigar Lighter require a sufficient length of power cord, which, however, may interfere with smooth operations with the car appliances. Cordless type of such electrical appliances are often rather expensive and may result in waste of resources.

SUMMARY OF THE INVENTION

One object of the present invention is thus to provide novel applications of a battery pack, which is detachably attached to specific power-driven tools.

Another object of the invention is to provide a battery holder applicable as a separate power source of portable electrical appliances used for and in automobiles.

The above and the other related objects are realized by a battery holder of the present invention, which includes a housing, an accommodation space for receiving a battery pack detachably attached to a power-driven tool or another electrical appliance, and connector means for electrically connecting with the battery pack received in the accommodation space.

An electrical appliance is connected to the connector means electrically connecting with the battery pack received in the accommodation space of the battery holder. This structure allows the battery pack generally attached to a specific electrical appliance, such as a power-driven tool, to be applied as a separate power source of another portable electrical appliance. This gives novel applications of the commercially available battery packs without lowering the performance thereof.

According to one preferable application, the battery holder further includes socket means connectable with a cigar lighter plug for a portable power-driven tool using a car battery as a power source, wherein the connector means is connectable with the cigar lighter plug via the socket means.

The battery holder thus constructed is connectable with a cigar lighter plug. This allows one battery pack to be used as a power source attached to specific power-driven tools, as a power source in place of the car battery for portable electrical appliances specifically designed to be used in or for automobiles, and as a separate power source for other portable electrical appliances not specifically designed to be used in or for automobiles. The battery holder connecting with the cigar lighter plug does not require any obstructive power code and allows the smooth operations with the portable electrical appliances.

In accordance with one preferable embodiment, the battery pack includes a plurality of cells and an electrically connectable terminal for supplying power to a power-driven tool or another instrument and receiving power from a generator. The battery pack is selectively connected to the power-driven tool or instrument as a power source or to the generator for the purpose of charging.

In one preferable structure, the connector means includes negative and positive terminal metals electrically connectable with the terminal of the battery pack, the socket means further including an electrode cylinder electrically connectable with the negative terminal metal of the connector means and an electrode plate electrically connectable with the positive terminal metal of the connector means, the cigar lighter plug further including an anode projection and a cathode projection, wherein the anode projection of the cigar lighter is fitted in the electrode cylinder of the socket means to be electrically connected with the electrode cylinder, and the cathode projection of the cigar lighter is in contact with the electrode plate of the socket means to be electrically connected with the electrode plate.

In accordance with another preferable application, the housing includes an inlet through which the battery pack is inserted, and a cover plate for opening and closing the inlet.

These and other objects, features, aspects, and advantages of the present invention will become more apparent from the following detailed description of the preferred embodiment with the accompanying drawings.

DESCRIPTION OF THE PREFERRED EMBODIMENT

Figure 1:
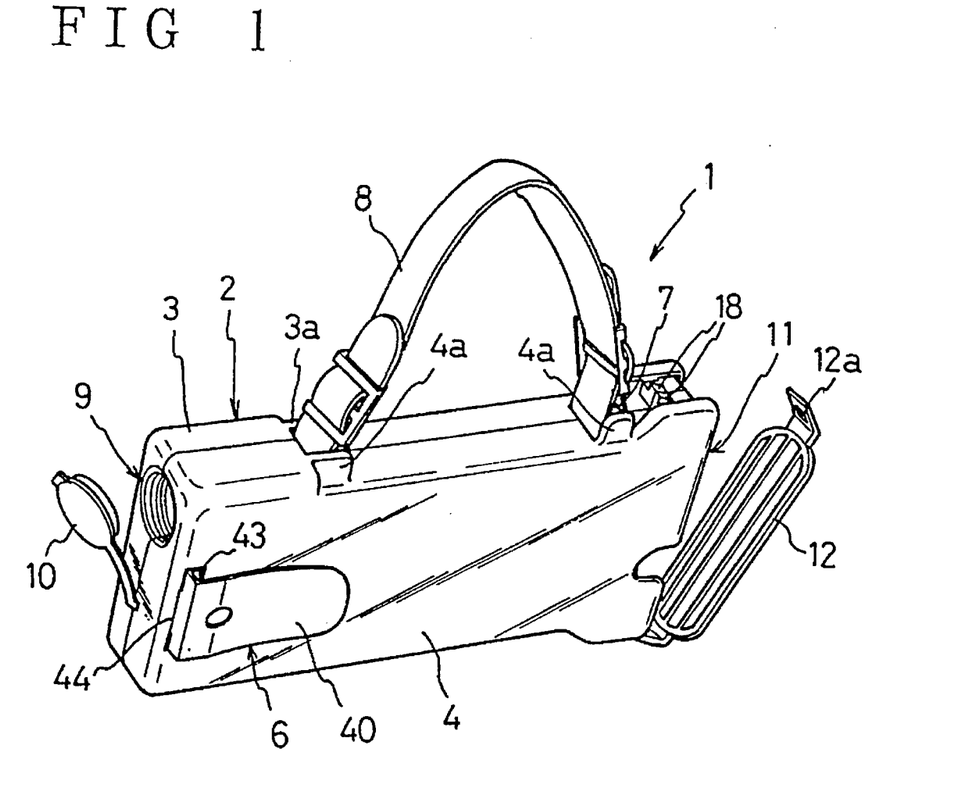
FIG. 1 is a perspective view illustrating a battery holder 1 embodying the present invention.

FIG. 1 is a perspective view illustrating a battery holder 1 embodying the present invention. A body 2 made of a synthetic resin is a flat box-like part including an upper housing 3 and a lower housing 4, which are separable from and joined with each other by means of a plurality of bolts 5 (one shown in FIG. 10). A metal hook 6 projected from the lower housing 4 is held and fixed between the upper housing 3 and the lower housing 4 while they are bolted to each other. The body 2 of the battery holder 1 may be hung on a belt via the metal hook 6. As clearly shown in FIG. 4, a pair of pins 7,7 extend from a pair of first guides 4a,4a on the lower housing 4 towards the upper housing 3 and are securely received by a pair of second guides 3a,3a on the upper housing 3. A shoulder belt or hand strap 8 with both ends thereof held by the pair of pins 7,7 is attached to the body 2 for making the battery holder 1 handy to carry.

Figure 2:
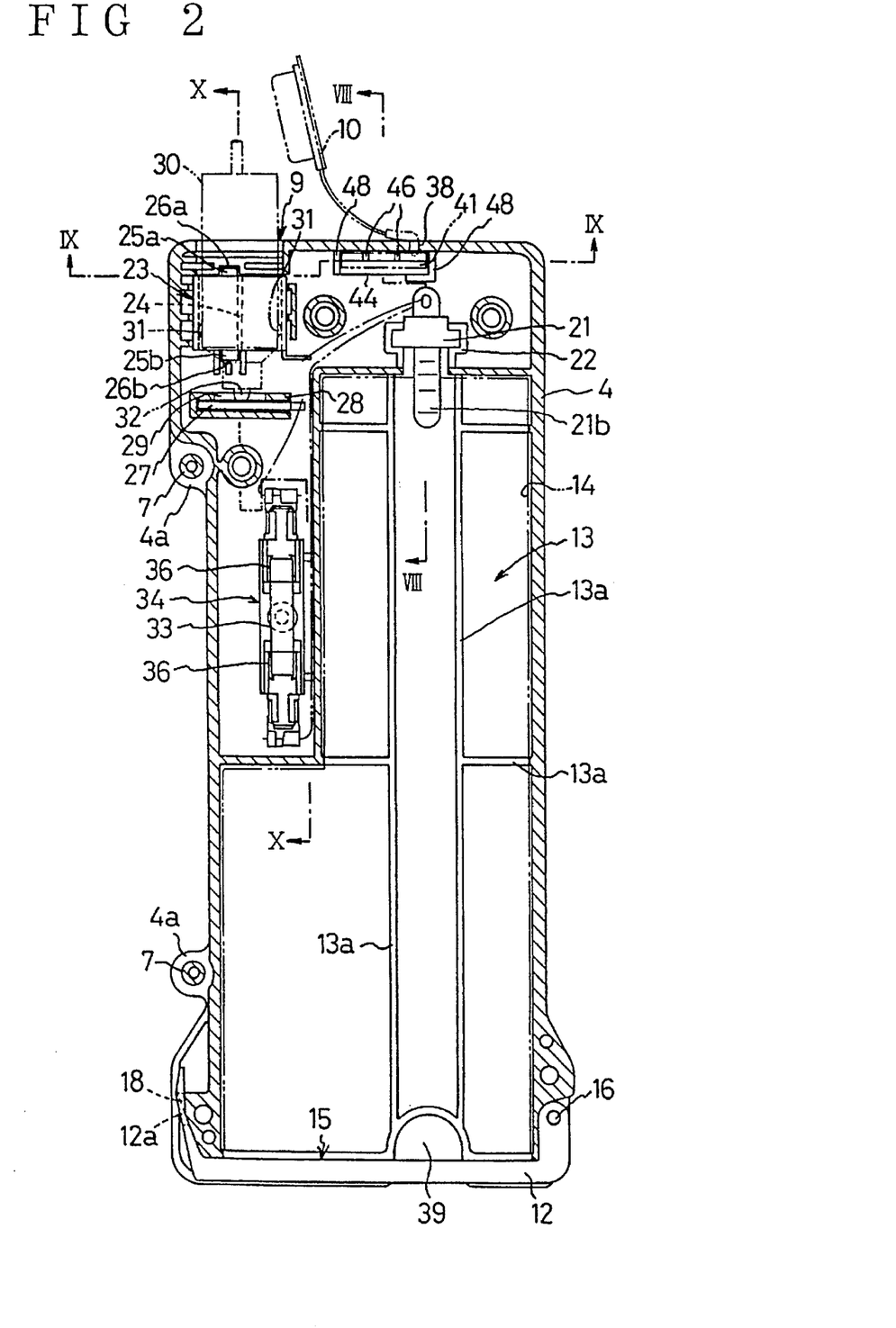
FIG. 2 illustrates structure of a lower housing 4.
Figure 9:
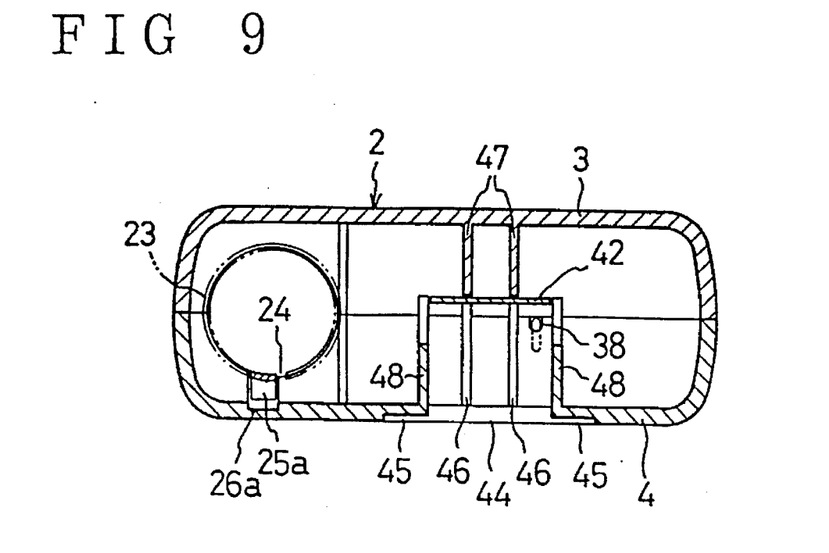
FIG. 9 is a cross sectional view showing the upper housing 3 and the lower housing 4 joined with each other, taken on the line IX—IX in FIG. 2.

There is a socket element 9 on one shorter side of the body 2. A cigar lighter plug (not shown here) is connectable with the socket element 9. A cap 10 covers the socket element 9 when the battery holder 1 is not used in the vehicle. One end of the cap 10 held between the upper housing 3 and the lower housing 4 is securely fixed by a notch 38 as shown in FIG. 2 and 9. An inlet 11 of a battery pack (described later) and a cover plate 12 for opening and closing the inlet 11 are provided on the other shorter side of the body 2.

Figure 3:
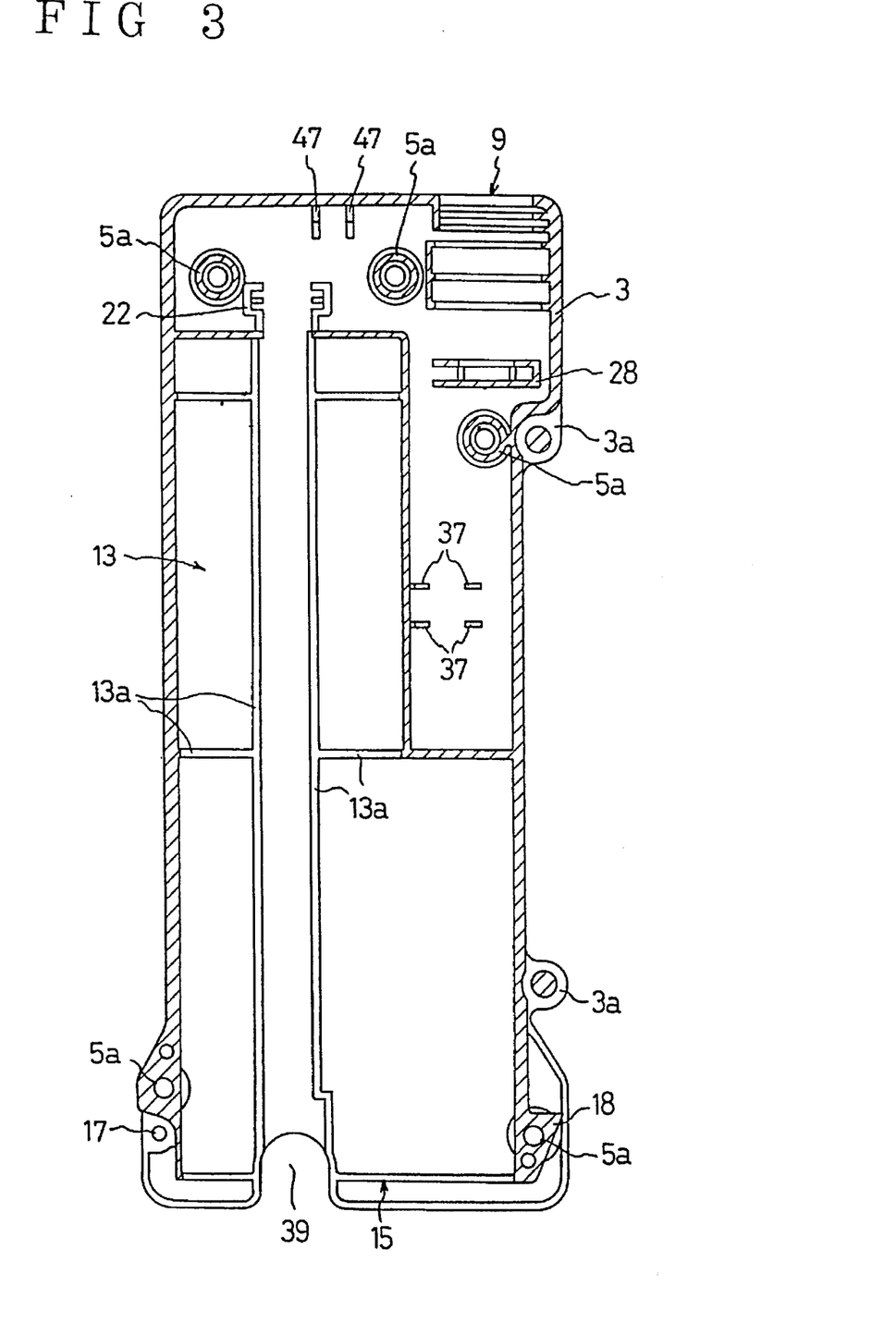
FIG. 3 illustrates structure of an upper housing 3.
Figure 4:
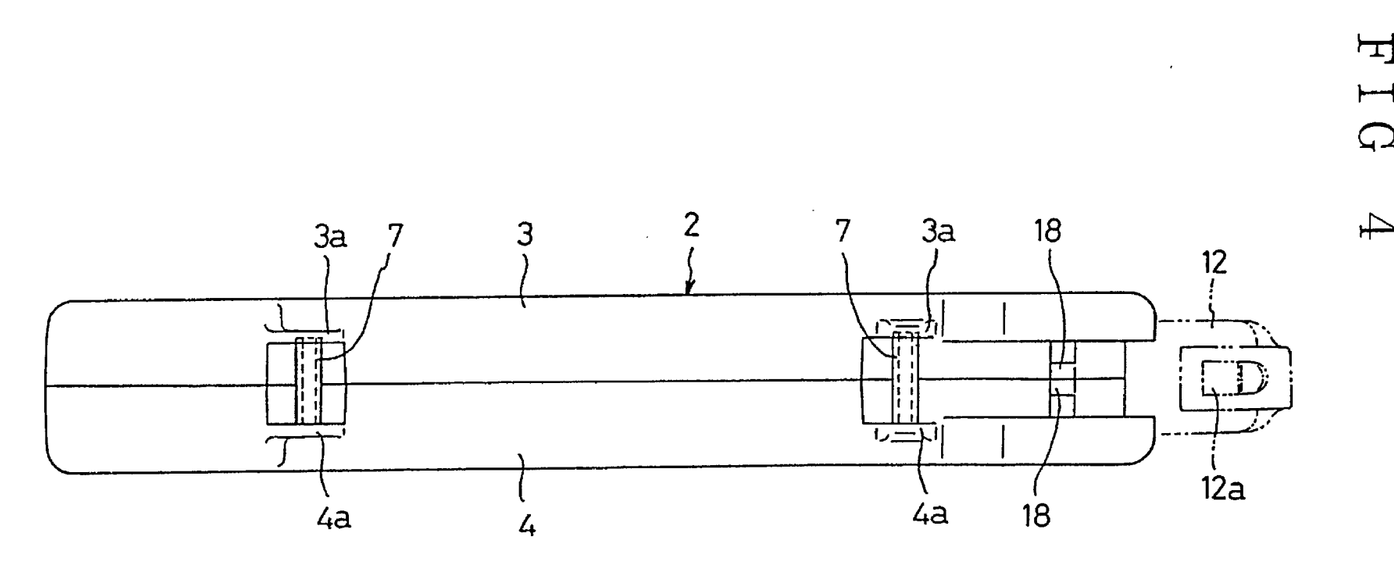
FIG. 4 is a plan view illustrating a top portion of the battery holder 1 without a hand strap 8.
Figure 5:
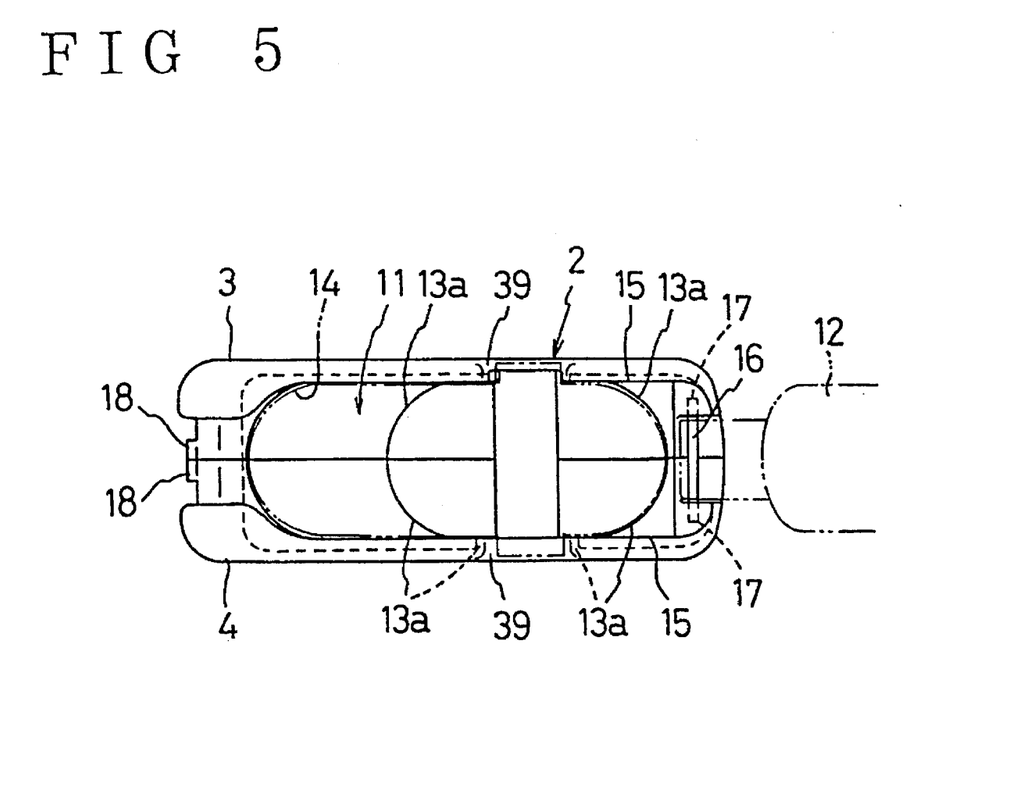
FIG. 5 shows structure of an inlet 11 for a battery pack 14 and a cover plate 12.
Figure 6:
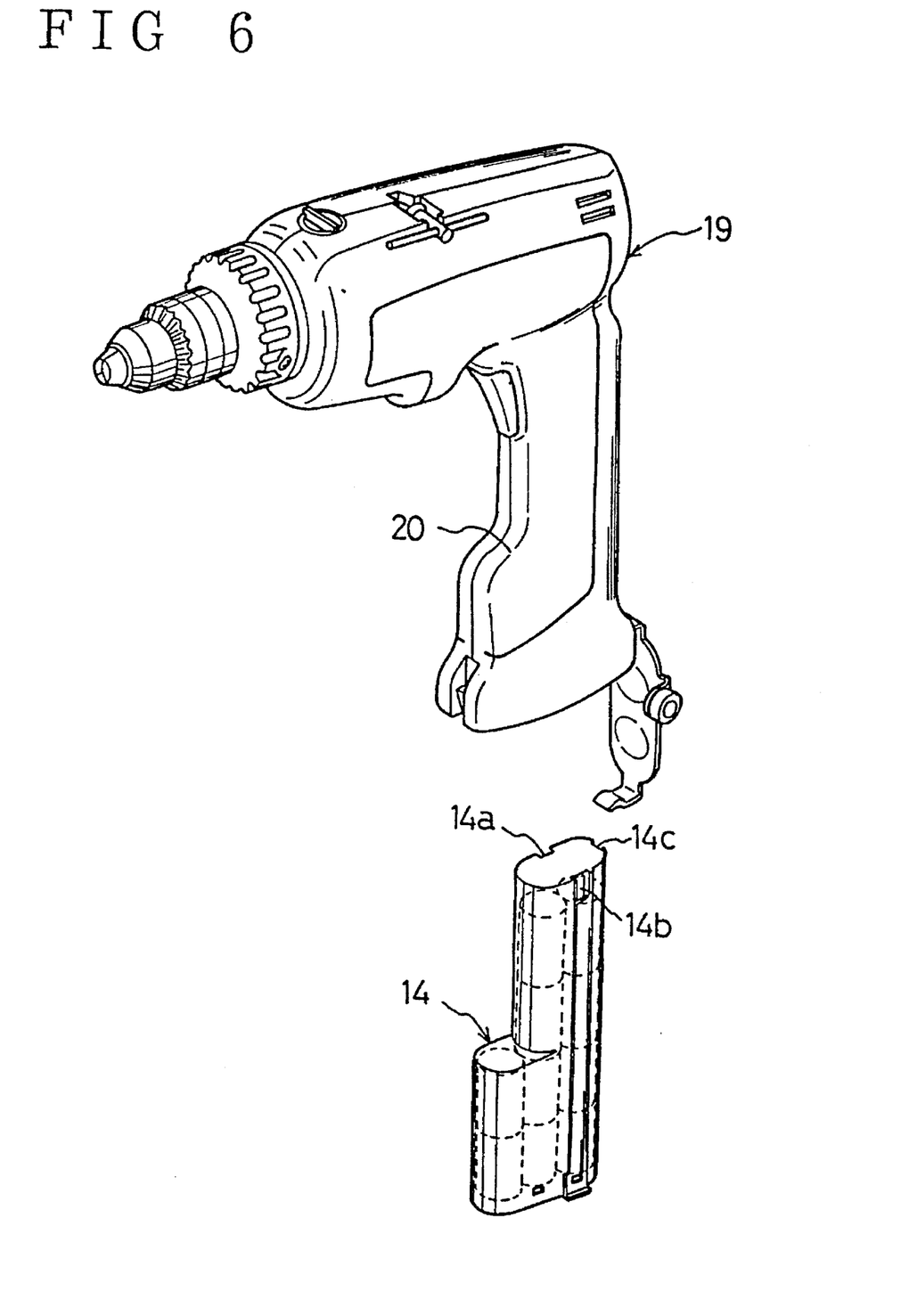
FIG. 6 illustrates the battery pack 14 inserted in a power-driven tool.

FIG. 2 illustrates structure of the lower housing 4; and FIG. 3 illustrates structure of the upper housing 3. In the drawings of FIGS. 2 and 3, hatched portions denote elements of each housing which are in contact with the corresponding elements of the mated housing. Substantially L-shaped sections 13,13 formed on both the upper housing 3 and the lower housing 4 receive a battery pack 14 in the space defined thereby. There are openings 15,15 connecting with the substantially L-shaped sections 13,13 to form the inlet 11. The substantially L-shaped sections 13,13 of the upper housing 3 and the lower housing 4 have a plurality of ribs 13a,13a, which come into contact with the outer surface of the battery pack 14 to securely receive the battery pack 14. Semicircular cuts 39,39 formed on both the upper housing 3 and the lower housing 4 allow the battery pack 14 to be easily taken out of the space of the substantially L-shaped sections 13,13. Referring to FIGS. 4 and 5, in the vicinity of the inlet 11, there are through holes 17,17, in which a pin 16 for supporting one end of the cover plate 12 is inserted, and engagement clicks 18,18 for resiliently engaging with a mating element 12a formed on the other end of the cover plate 12. The battery pack 14 used in the embodiment is a commercially available one including a plurality of nickel-cadmium cells and having a positive terminal 14a, a negative terminal 14b, and a thermostat terminal 14c used for temperature control as shown in FIG. 6. When the battery pack 14 is inserted in a handle element 20 of a power-driven tool 19, the terminals 14a, 14b, and 14c on the battery pack 14 are connected to the power-driven tool 19 to supply a 12 V power.

Figure 10:
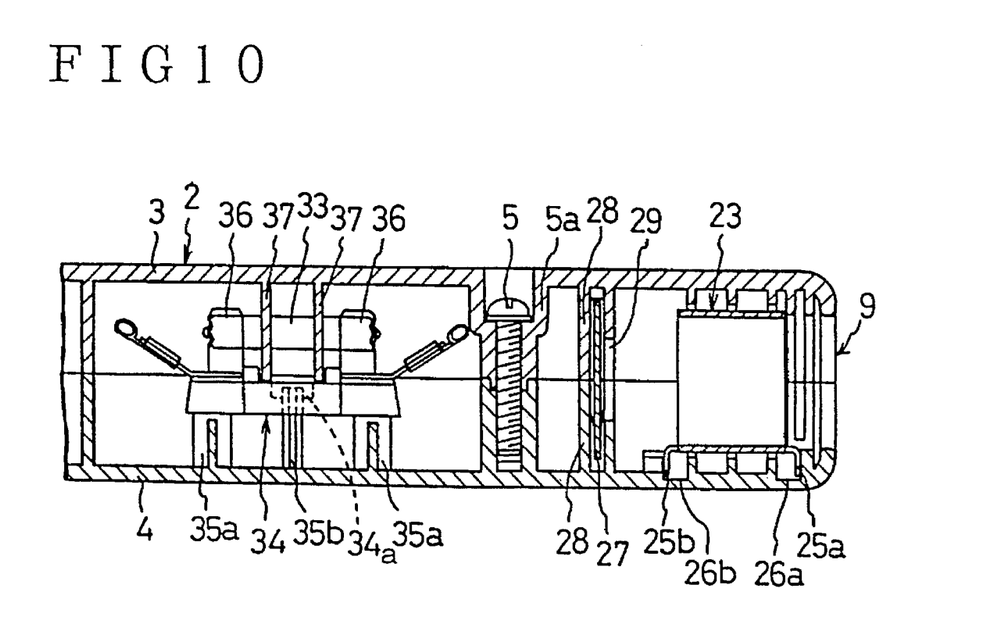
FIG. 10 is a cross sectional view showing the upper housing 3 and the lower housing 4 joined with each other, taken on the line X—X in FIG. 2.

Referring back to FIG. 2, the body 2 of the battery holder 1 further includes a terminal holder 21, to which the positive terminal 14a and the negative terminal 14b of the battery pack 14 are connected simultaneously with insertion of the battery pack 14 into the battery holder 1. As clearly shown in FIGS. 7 and 8, the terminal holder 21 is provided with a negative (−) terminal metal 21b and a positive (+) terminal metal 21a and held between a pair of seats 22,22 formed on both the upper housing 3 and the lower housing 4. Referring to FIGS. 2, 9, and 10, a lead wire of the negative terminal metal 21b connects with an electrode cylinder 23 disposed in the socket element 9, whereas a lead wire of the positive terminal metal 21a is connected to an electrode plate 27 via a fuse 33. The electrode cylinder 23 is in electrical contact with anode projections 31,31 on a side face of a cigar lighter plug 30, which is inserted through the socket element 9 of the battery holder 1. The cigar lighter plug 30 is fitted in the resilient electrode cylinder 23 with a slit 24 in a relatively tight fashion. The electrode cylinder 23 is further provided with a plurality of engagement pieces 25a and 25b projected from both ends of its axis. The plurality of engagement pieces 25a and 25b are respectively received by a plurality of engagement recesses 26a and 26b formed in the lower housing 4 in order to prevent an accidental slip-off or rotation of the electrode cylinder 23. The electrode plate 27 is supported by a pair of support elements 28,28 before the cigar lighter plug 30. An exposed face of the electrode plate 27 by a circular notch 29 is in electrical contact with a cathode projection 32 on an end of the cigar lighter plug 30 inserted through the socket element 9 of the battery holder 1.

The fuse 33 is used for protecting the battery from a short circuit and is received in a fuse holder 34 formed along the substantially L-shaped sections 13 for accommodating the battery pack 14 therein. Referring to FIG. 10, the fuse holder 34 is set on a plurality of pins 35a,35a projecting from the lower housing 4. The fuse holder 34 has a stepped recess 34a formed on the center thereof. A pin 35b inserted into the stepped recess 34a has a head welded to the stepped recess 34a for preventing an accidental slip-off. The fuse 33 is held between a pair of support metals 36,36 respectively connecting with lead wires. When the upper housing 3 is joined with the lower housing 4, a pair of support pieces 37,37 projected from the upper housing 3 are in contact with the upper face of the fuse holder 34. Although the fuse 33 is held in the structure including the fuse holder 34 in this embodiment, other simpler structures may be applicable. For example, a fuse 33 with lead wires directly soldered on both ends thereof may be covered with a transparent tube.

The metal hook 6 is held between the upper housing 3 and the lower housing 4 in the following manner.

Figure 7:
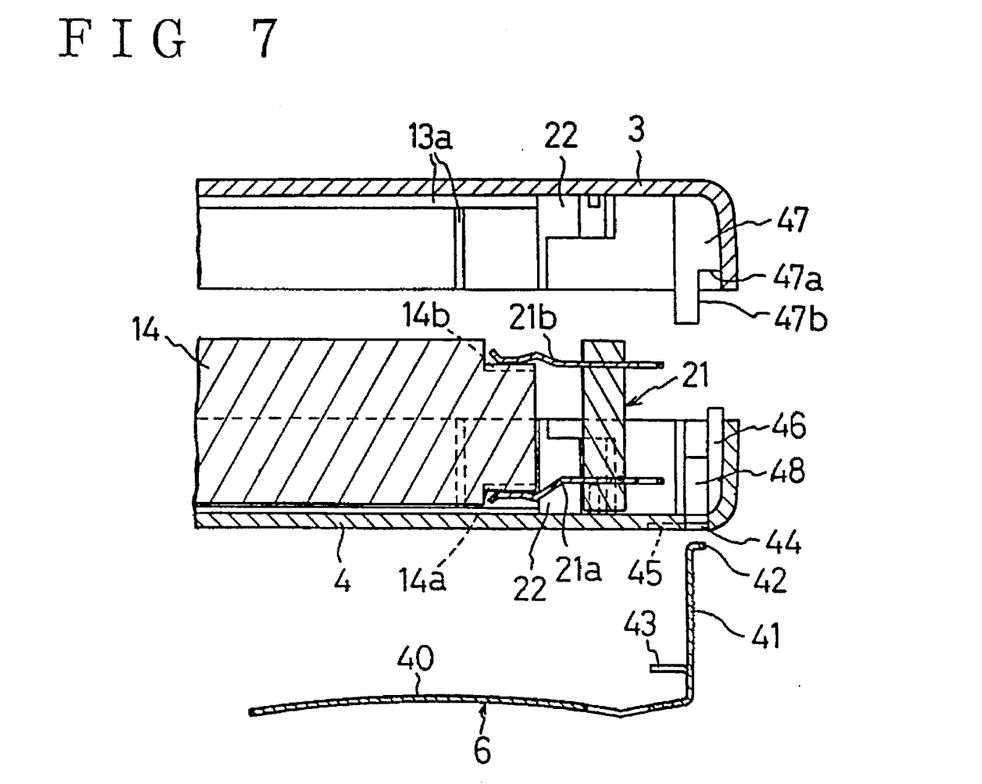
FIG. 7 shows structure of holding a metal hook 6 between the upper housing 3 and the lower housing 4.
Figure 8:
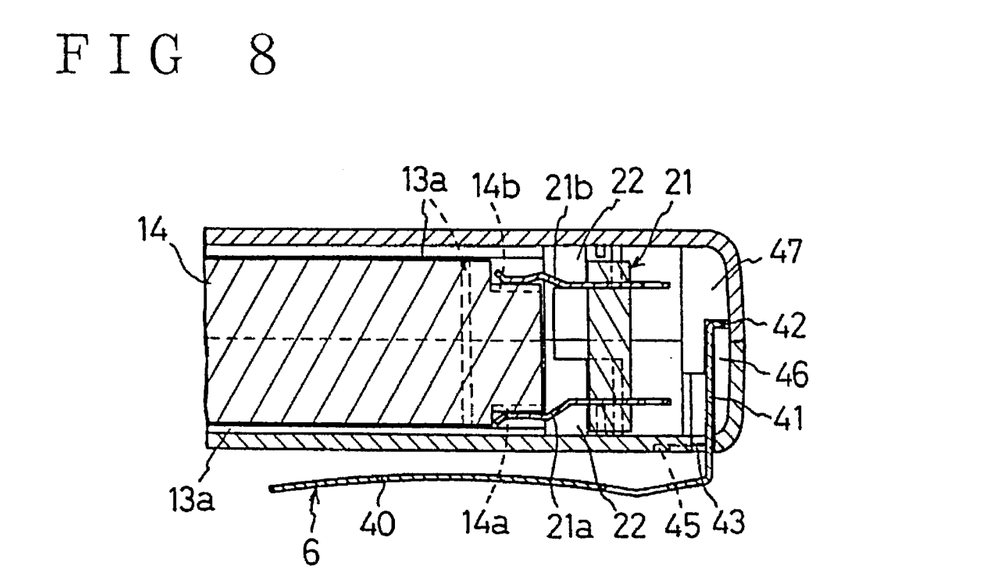
FIG. 8 is a cross sectional view showing the upper housing 3 and the lower housing 4 joined with each other, taken on the line VIII—VIII in FIG. 2.

Referring to FIGS. 1, 7, and 8, the metal hook 6 includes a tongue-like flap 40, a fixation element 41 extending from the flap 40 in a substantially perpendicular orientation, an end element 42 bent perpendicular to the fixation element 41, and a pair of contact elements 43,43 turned on the fixation element 41 to be arranged in parallel with the surface of the lower housing 4. The fixation element 41 passes through a slot 44 formed in a shorter side of the lower housing 4 while the contact elements 43,43 are received in a pair of recesses 45,45 formed on the surface of the lower housing 4, so that the metal hook 6 is attached to the lower housing 4. The end element 42 of the metal hook 6 engages with upper ends of a pair of upright elements 46,46 formed in the shorter side of the lower housing 4.

A pair of L-shaped suspended elements 47,47 formed in the corresponding shorter side of the upper housing 3 are arranged at the same interval as that of the upright elements 46,46. Each suspended element 47 includes a base portion 47a coming into contact with the upper face of the end element 42 of the hook 6, which is engaged with the upright elements 46,46 of the lower housing 4, and a projection 47b coming into contact with the rear face of the fixation element 41. When the upper housing 3 and the lower housing 4 are joined with each other, the fixation element 41 and the end element 42 of the hook 6 are held by the pair of suspended elements 47,47 and the pair of upright elements 46,46. This simple structure allows the metal hook 6 to be securely fixed in the body 2 of the battery holder 1. The lower housing 4 is further provided with a plurality of guide plates 48,48 placed on both sides of the fixation element 41 of the metal hook 6 to securely hold the fixation element 41.

Referring to FIG. 2, in the battery holder 1 thus constructed, the terminal holder 21, the fuse holder 34, the electrode cylinder 23, and the electrode plate 27 connecting with lead wires are placed on the lower housing 4. After the fixation element 41 of the metal hook 6 is inserted through the slot 44 and the end element 42 of the hook 6 is engaged with the pair of upright elements 46,46, the pin 16 for supporting one end of the cover plate 12 is inserted into the through holes 17,17. The lower housing 4 is then joined with the upper housing 3, and the plurality of bolts 5,5, . . . are secured to a plurality of seats 5a,5a, . . . formed in the upper housing 3. Simultaneously with the assembly of the body 2, the metal hook 6 is held by the suspended elements 47,47 of the upper housing 3 and the upright elements 46,46 of the lower housing 4. This does not require any additional time or labor for attachment of the hook 6.

The battery pack 14 previously charged is inserted through the inlet 11, which is subsequently covered with the cover plate 12 by engaging the engagement clicks 18 of the body 2 with the mating element 12a on the cover plate 12. The positive terminal 14a and the negative terminal 14b of the battery pack 14 are held by the terminal holder 21 in the body 2 of the battery holder 1 and brought into electrical contact with the positive terminal metal 21a and the negative terminal metal 21b to be ready for discharge, as shown in FIG. 8.

The cigar lighter plug 30 for portable electrical appliances receiving a power from a car battery, such as a car polisher and a portable vacuum cleaner, is inserted into the socket element 9 of the battery holder 1 of the embodiment. The battery pack 14 accommodated in the battery holder 1 to be used for specific power-driven tools is then applicable as a separate power source of the portable electrical appliances. The battery holder 1 has the metal hook 6 and the shoulder belt or hand strap 8 for the convenience of carrying and hanging. The battery holder 1 of the embodiment does not require any obstructive power code and allows the smooth operations with the portable electrical appliances. As long as the voltage level is identical, other portable electrical appliances designed not specifically for the cigar lighter may be connected to the battery holder 1 via a connection cable with a cigar lighter plug.

There may be many other modifications, alternations, and changes without departing from the scope or spirit of essential characteristics of the invention. It is thus clearly understood that the above embodiment is only illustrative and not restrictive in any sense. Some examples of modification are given below.

Although the battery holder 1 of the embodiment has the space defined by the substantially L-shaped sections 13,13 for receiving the battery pack 14, the space may have any desired shape corresponding to the shape of the battery pack 14 accommodated therein. The battery holder 1 may receive battery packs for video cameras, transceivers, and other specific battery-driven equipment as well as the power-driven tools. The electrical connection of the terminal holder 21 and the other related elements is varied according to the type of battery used. In the embodiment, the body 2 of the battery holder 1 includes separable upper housing 3 and lower housing 4. Other structures including an integral housing with a hinge or a box with a lid may also be applicable.

The battery holder 1 of the embodiment is connectable with the cigar lighter plug 30 and thus preferably applied to the electrical appliances used in or for automobiles. According to one alternative structure, in place of the electrode cylinder 23 and the electrode plate 27, the socket element 9 has a known connection plug for discharge only or for both charge and discharge. This allows the battery pack to be used as a power source of other portable electrical appliances. Still another possible structure has both the socket element for a cigar lighter and a conventional connection plug. In this case, the user can select either the cigar lighter or the connection plug according to the type of electrical appliance used. The shape of the socket element is not restricted to the above structure but may be modified arbitrarily.

The scope and spirit of the present invention are limited only by the terms of the appended claims.

What is claimed is:

1. A battery holder comprising
   a housing,
   an accommodation space for receiving a battery pack detachably attached to a power-driven tool or another electrical appliance,
   connector means for electrically connecting with said battery pack received in said accommodation space, and
   socket means connectable with a cigar lighter plug for a portable power-driven tool using a car battery as a power source, said connector means being connectable with the cigar lighter plug via said socket means.

2. A battery holder in accordance with claim 1, wherein said battery pack comprises a plurality of cells and an electrically connectable terminal for supplying power to a power-driven tool or another instrument and for receiving power from a generator, said battery pack being selectively electrically connected to said power-driven tool or instrument by insertion into a base thereof as a power source or connected to said generator for the purpose of charging.

3. A battery holder in accordance with claim 1, wherein said connector means comprises negative and positive terminal metals electrically connectable with a terminal of said battery pack,
   said socket means further comprising an electrode cylinder electrically connectable with said negative terminal metal of said connector means and an electrode plate electrically connectable with said positive terminal metal of said connector means,
   said cigar lighter plug further includes an anode projection and a cathode projection,
   wherein said anode projection of said cigar lighter is fitted in said electrode cylinder of said socket means to be electrically connected with said electrode cylinder, and said cathode projection of said cigar lighter is in contact with said electrode plate of said socket means to be electrically connected with said electrode plate.

4. A battery holder in accordance with claim 1, wherein said housing comprises an inlet through which said battery pack is inserted, and a cover plate for opening and closing said inlet.

* * * * *